(12) United States Patent
Margolin et al.

(10) Patent No.: US 11,683,377 B1
(45) Date of Patent: Jun. 20, 2023

(54) IDENTIFICATION OF REDUNDANT ELECTRONIC MODULES IN AN INTERCONNECTED NETWORK

(71) Applicant: PAYPAL, INC., San Jose, CA (US)

(72) Inventors: Itay Margolin, Tel Aviv (IL); Matan Marudi, Tel Aviv (IL); Roy Lothan, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/871,028

(22) Filed: Jul. 22, 2022

(51) Int. Cl.
*G06F 15/16* (2006.01)
*H04L 67/12* (2022.01)
*H04L 41/14* (2022.01)
*H04L 12/46* (2006.01)

(52) U.S. Cl.
CPC ............ *H04L 67/12* (2013.01); *H04L 41/145* (2013.01); *H04L 12/46* (2013.01)

(58) Field of Classification Search
CPC ........ H04L 67/12; H04L 41/145; H04L 12/46
See application file for complete search history.

(56) References Cited

U.S. PATENT DOCUMENTS

| | | |
|---|---|---|
| 9,485,413 B2 | 11/2016 | Vachharajani et al. |
| 11,265,402 B2 | 3/2022 | Wouhaybi et al. |
| 2019/0090305 A1 | 3/2019 | Hunter et al. |

*Primary Examiner* — Normin Abedin
(74) *Attorney, Agent, or Firm* — Haynes and Boone, LLP

(57) ABSTRACT

An electronic network, such as an autonomous vehicle, an Internet of Things (IoT) network, a medical device system, or a network security system, is accessed. The electronic network contains a plurality of electronic modules, such as electronic sensors, that each have a predefined functionality. Data associated with the electronic modules is collected over a predefined period of time. A matrix is constructed based on the collected data. Based on the matrix, a redundant electronic module is detected from the plurality of electronic modules. A functionality of the redundant electronic module is replicated collectively by one or more other electronic modules of the plurality of electronic modules. A value added by the redundant electronic module to the electronic network is evaluated. Based on the evaluated value, a determination is made as to whether the redundant electronic module should be removed from the electronic network.

20 Claims, 9 Drawing Sheets

IDENTIFICATION OF REDUNDANT ELECTRONIC MODULES IN AN INTERCONNECTED NETWORK

BACKGROUND

Field of the Invention

The present disclosure generally relates to electronic modules (e.g., sensors) in electronic networks. More specifically, the present disclosure relates to electronic modules in interconnected networked such as autonomous vehicles, Internet of Things (IoT) networks, medical device systems, etc.

Related Art

Rapid advances have been made in the past several decades in the fields of computer technology and telecommunications. The result is a proliferation of interconnected electronic networks, where various electronic modules of the network interact with one another, as well as with other components of the network, to ensure the overall health and proper functioning of the network. For example, autonomous vehicles or IoT systems may use sensors (e.g., cameras, satellite positioning units, accelerometers, transceivers, etc.) as a form of electronic modules to monitor the status of various components of the autonomous vehicles or IoT systems and to determine what actions, if any, need to be taken based on the monitored status.

However, as the complexity of these interconnected networks grows over time, it may become too cumbersome for the interconnected network to handle all of these electronic modules. For example, the potential benefit provided by some of the electronic modules may be outweighed by the resources needed to implement and/or maintain these electronic modules, particularly if their functionalities can be duplicated by other electronic modules of the interconnected network. Therefore, although existing interconnected networks have been generally adequate for their intended purposes, they have not been entirely satisfactory in every aspect.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
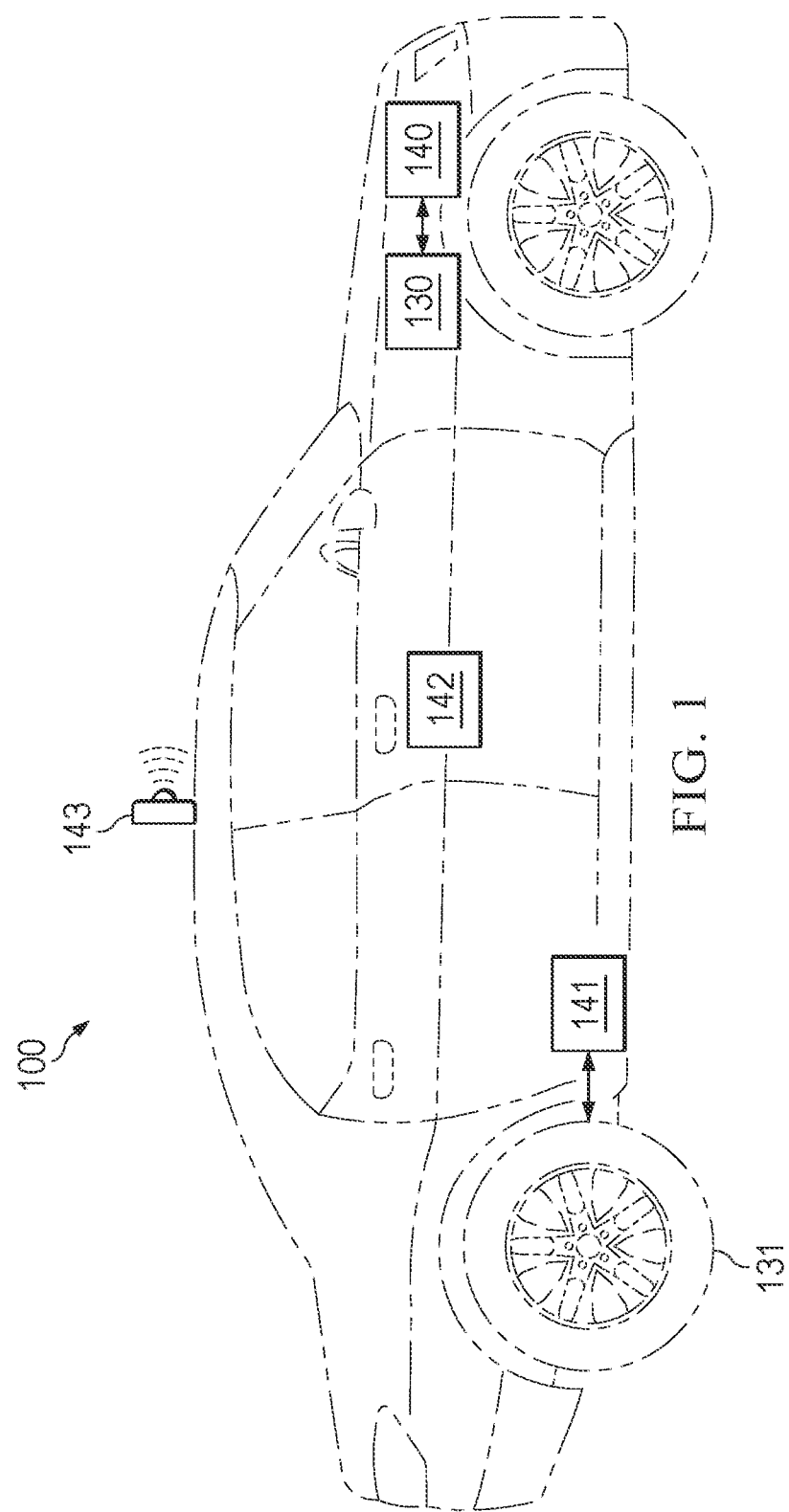
FIGS. 1-5 are simplified block diagrams that illustrate various embodiments of interconnected networks according to various aspects of the present disclosure.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made without departing from the scope described herein. Various aspects are capable of other embodiments and of being practiced or being carried out in various different ways.

Due to rapid advances in the fields of computer technology and telecommunications, interconnected networks have proliferated recently. For example, a vehicle may include a variety of components, such as engine, transmission, steering, brakes, suspension, wheels, front and rear axles, etc. A plurality of electronic modules, such as electronic sensors, may also be implemented on the vehicle to monitor the status of the various components and to determine actions to perform based on the monitored status. As non-limiting examples, the sensors may include cameras, radars, light detection and ranging (Lidar) sensors, satellite positioning units (e.g., Global Positioning System (GPS) units), accelerometers, speed sensors, air flow detectors, temperature sensors, pressure sensors, transceivers, etc. Other examples of interconnected networks may include Internet of Things (IoT) networks, medical device systems, network security systems, or electronic transaction systems. The electronic modules may also include modules with predefined rules, which may specify what actions should be taken based on a monitored status of a component of the interconnected network.

As the complexity of these interconnected networks grows over time, it may become too cumbersome for the interconnected network to handle all of these electronic modules. For example, the potential benefit provided by some of the electronic modules may be outweighed by the resources needed to implement and/or maintain these electronic modules. This is particularly true if an electronic module becomes redundant, for example, if their functionalities can be duplicated by one or more other electronic modules of the interconnected network.

According to various aspects of the present disclosure, the redundant electronic modules are identified from a plurality of electronic modules of an interconnected network. The electronic modules may each have a predefined functionality. For example, the functionality may include monitoring the status of one or more components of the interconnected network, detecting different conditions of the interconnected network, and/or specifying actions (if any) to be taken in response to different statuses being monitored or different conditions of the electronic network being met, respectively.

Over a period of time, data pertaining to the electronic modules is gathered. For example, the gathered data may pertain to a plurality of events that are associated with at least some of the conditions detected by the electronic modules, where the data indicates a coverage of the events by each of the electronic modules. Thereafter, a matrix is accessed. In some embodiments, the matrix may be constructed based on the plurality of electronic modules and the plurality of events. Matrix operations may also be performed on the matrix to transform the matrix into a matrix with a predefined format. For example, Gaussian Elimination operations may be performed to the matrix until the matrix is in a reduced row echelon form.

The redundant electronic modules may be identified based on the matrix. For example, each of the electronic modules may correspond to a respective vector (e.g., a column) in the matrix. If a vector can be reconstructed using one or more other vectors of the matrix, that means that the electronic module corresponding to that vector is a redundant electronic module. Once the redundant electronic modules are identified, an evaluation is made with respect to the incremental value added to the interconnected network by the redundant electronic module. If the incremental value is determined to be below a predefined threshold, then the redundant electronic module may be removed from the interconnected network. By removing redundant electronic modules that do not add much incremental value to the overall interconnected network, less resource—which may be a hardware resource and/or a software resource—is wasted, and the cost to implement and/or maintain the interconnected network is reduced.

As discussed below in more detail, the concepts of the present disclosure are directed to improvements in computer technology. For example, by removing redundant electronic modules from an interconnected network, computer processing power (that would have been used to interact with the redundant electronic modules) is saved, which may increase the processing speed of the overall interconnected network. In addition, the removal of the redundant electronic modules frees up communication bandwidth, which may increase the communication speed of the overall interconnected network. Furthermore, since no redundant data (normally gathered by the redundant electronic modules) needs to be stored electronically, the present disclosure also saves computer storage space. The concepts of the present disclosure can be used in a variety of real-world applications. For example, a vehicle may be designed and operated in a computer simulated environment, where various electronic modules (e.g., sensors) may be implemented as a part of the vehicle. The present disclosure allows redundant electronic modules to be identified during the simulation, so that they need not be implemented in the production phase of the vehicle. The same may apply to other interconnected networks, such as IoT networks and medical device systems. As another example, predefined rules pertaining to network security and/or fraud prevention may be identified and removed, so that these rules do not clutter up the overall execution of the network on which they were implemented. As a result, the network can be run more efficiently and at a lower cost.

FIG. 1 illustrates a simplified block diagram of a vehicle system 100 implemented according to an embodiment of the present disclosure. The vehicle system 100 may include a conventional vehicle that is operated by a human in some embodiments, or it may include an autonomous vehicle (e.g., a self-driving vehicle) in other embodiments. The vehicle system 100 is an example of an interconnected electronic network, as it may include a plurality of components such as engine, transmission, steering, brakes, suspension, wheels, front and rear axles, etc, that are electronically and/or mechanically coupled together and that exchange information with one another. For the sake of providing a simplified example to facilitate the ensuing discussions, an engine 130 and a tire 131 are labeled in FIG. 1 as example components of the vehicle system 100.

A plurality of electronic modules, such as electronic sensors, may be implemented as a part of the vehicle system 100 to monitor the status of the various components and to determine actions to perform based on the monitored status. Again, for the sake of providing a simplified example to facilitate the ensuing discussions, electronic modules 140-143 are illustrated in FIG. 1 as example electronic modules. For example, the electronic module 140 may include a temperature sensor that is thermally coupled to the engine 130 to monitor a temperature of the engine 130. As another example, the electronic module 141 may include a pressure sensor that is coupled to the tire 131 to monitor a pressure of the tire 131.

The electronic modules may also include sensors that are configured to monitor a status of an overall status of the vehicle system 100, rather than the status of a particular component individually. For example, the electronic module 142 may include a GPS unit to monitor the geographical location (e.g., the GPS coordinates) of the vehicle system 100 at any given point in time. As yet another example, the electronic module 143 may include a camera, a radar, or a Lidar to monitor the physical surroundings of the vehicle system 100 as a whole.

It is understood that multiple electronic modules of the same type may also be implemented as a part of the vehicle system 100. For example, the vehicle system 100 may include a plurality of electronic modules 140 (e.g., temperature sensors in the embodiment of FIG. 1) to measure temperatures at different parts of the engine 130. As another example, the vehicle system 100 may include a plurality of electronic modules 143 (e.g., a plurality of different cameras pointing at different directions, or a camera and a radar) to capture the surroundings at different directions of the vehicle 100. As such, each illustrated instance of an electronic module in FIG. 1 (or in the subsequent figures discussed below) may represent multiple electronic modules, which may or may not be the same type of electronic module.

As more and more electronic modules are added to the vehicle system 100, some of the electronic modules may become redundant. An electronic module may be redundant if its functionality can be duplicated by one or more other electronic modules of the vehicle system 100. For example, in an embodiment of the vehicle system 100 that includes multiple electronic modules 140 (e.g., temperature sensors) to monitor the temperature of the engine 130, it may be determined that the temperature measured by a first one of the electronic modules 140 is the same as the temperature measured by a second one of the electronic modules 140. As such, either the first or the second one of the electronic modules 140 may be considered redundant. As another example, in an embodiment of the vehicle system 100 that implements multiple cameras, multiple radars, and multiple lidars as the electronic modules 143, it may be determined that the image captured by a first one of the cameras may be duplicated by one or more second cameras, or by duplicated by the one or more second cameras, the radars, and the lidars collectively. Module redundancy may result when new modules are added, when new components are added such that the module associated with the previous component is no longer needed, or when an existing component is updated such that the module associated with the updated component is no longer needed.

Having redundant electronic modules in the vehicle system 100 is wasteful. Their implementation alone needs costly resources, which may include hardware resources and/or software resources. In addition, additional processing resources may be needed to operate the redundant electronic modules. For example, the operation of a redundant electronic module may take up valuable processing power of a central processing unit (CPU) or a micro-controller. As an example, the exchange of information between the redundant electronic module and other electronic modules or other components of the vehicle system 100 may occupy precious communication bandwidth of one or more transceivers, transmitters, or receivers. Therefore, it may be beneficial to remove redundant electronic modules from the vehicle system 100, depending on whether an incremental value added by the redundant electronic module to the vehicle system 100 meets a predefined threshold.

According to various aspects of the present disclosure, the data pertaining to the electronic modules of the vehicle system 100 is gathered over a period of time, and a matrix is constructed based on the gathered data. Matrix operations are performed to transform the matrix to a matrix having a predefined form. The redundant modules may then be identified based on the transformed matrix having the predefined form. For example, the following Table 1 illustrates a matrix that is constructed based on the data pertaining to the electronic modules of the vehicle system 100 gathered over a period of time.

TABLE 1

| Status/Electronic Module | 1 | 2 | 3 | 4 |
|---|---|---|---|---|
| 1 | 1 | 0 | 1 | 0 |
| 2 | 0 | 1 | 1 | 1 |
| 3 | 1 | 0 | 1 | 0 |
| 4 | 1 | 0 | 1 | 0 |
| 5 | 0 | 1 | 1 | 1 |
| 6 | 1 | 0 | 1 | 0 |

Each column of the matrix of Table 1 represents a respective electronic module. As a non-limiting example, the columns 1-4 may correspond to the electronic modules 140-143 of FIG. 1, respectively. As another non-limiting example, the columns 1-4 may correspond to different instances of any one of the electronic modules 140-143 of FIG. 1 (e.g., different instances of the electronic modules 140).

Each row of the matrix of Table 1 represents a monitored status of the vehicle system 100. For example, each of the rows 1-6 may correspond to a respective event experienced by the vehicle system 100. As non-limiting examples, the events may include the vehicle system 100 overheating (e.g., having a temperature above a predefined threshold), the vehicle system 100 going above a predefined speed threshold, the vehicle system 100 going in a predefined direction (e.g., going forward or in reverse), the vehicle system 100 making a turn in a predefined direction (e.g., left turn or right turn), the vehicle system 100 being operated in a self-driving mode (e.g., without a human controlling the vehicle system 100), a particular component of the vehicle system 100 experiencing a malfunction, etc.

If a particular electronic module was activated (e.g., detected a condition and/or reported the condition to another component of the vehicle system 100) in response to the occurrence of a particular event (e.g., as an example of a monitored status), a value of 1 is assigned to the cell corresponding to that particular electronic module and that particular event. On the other hand, if a particular electronic module was not activated in response to the event, a value of 0 is assigned to the cell corresponding to that particular electronic module and that particular event.

Based on the values shown in Table 1, it can be said that:
  electronic modules 1 and 3 were activated in response to the occurrence of the event 1;
  electronic modules 2, 3, and 4 were activated in response to the occurrence of the event 2;
  electronic modules 1 and 3 were activated in response to the occurrence of the event 3;
  electronic modules 1 and 3 were activated in response to the occurrence of the event 4;
  electronic modules 2, 3, and 4 were activated in response to the occurrence of the event 5;
  electronic modules 1 and 3 were activated in response to the occurrence of the event 6;

In other words, Table 1 shows the coverage of the events 1-6 by each of the electronic modules 1-4.

As discussed above, an electronic module may be considered to be redundant if its functionality (e.g., the coverage of the events herein) is duplicated by one or more other electronic modules or no longer needed. In the form of the matrix, a column (corresponding to a particular electronic module) may be redundant if it can be expressed as a linear combination of other columns (corresponding to other electronic modules). In the above example, the column 3 can be constructed by adding columns 1 and 2. As such, the electronic module corresponding to column 3 is redundant. In addition, the column 4 is a copy of column 2. As such, the electronic module corresponding to column 4 is redundant, or the electronic module corresponding to column 2 is redundant.

According to various aspects of the present disclosure, matrix operations may be performed to the matrix of Table 1 to quickly identify the redundant columns (and therefore electronic modules). In some embodiments, the matrix operations may include the performance of a Gaussian Elimination algorithm to the matrix. The Gaussian Elimination algorithm may include a set of elementary row operations to transform the matrix to a matrix in a reduced row echelon form. In some embodiments, the elementary row operations may include:
  Interchanging one row of the matrix with another of the matrix.
  Multiplying one row of the matrix by a nonzero scalar constant.
  Replacing the one row with the one row plus a constant time another row of the matrix.

A matrix is in reduced row echelon form if it satisfies the following conditions:
  In each row, the left-most nonzero entry is 1, and the column that contains this 1 has all other entries equal to 0. This 1 is called a leading 1.
  The leading 1 in the second row or beyond is to the right of the leading 1 in the row just above.
  Any row containing only 0s is at the bottom of the matrix.

By performing the matrix operations (e.g., the Gaussian Elimination algorithm) to the matrix of Table 1, a matrix in reduced row echelon form may be obtained, which is illustrated in Table 2 below.

TABLE 2

| Status/Electronic Module | 1 | 2 | 3 | 4 |
|---|---|---|---|---|
| 1 | 1 | 0 | 1 | 0 |
| 2 | 0 | 1 | 1 | 1 |
| 3 | 0 | 0 | 0 | 0 |
| 4 | 0 | 0 | 0 | 0 |
| 5 | 0 | 0 | 0 | 0 |
| 6 | 0 | 0 | 0 | 0 |

A redundant column (corresponding to a redundant electronic module) may be identified from a matrix in reduced row echelon form via the 0 values of a diagonal of the matrix. In that regard, a diagonal of the matrix includes the elements (e.g., cells) that lie on the diagonal from the top left to the bottom right. In other words, the diagonal of the matrix represents each cell where the row number and the column number are equal. In the matrix shown in Table 2 above, the diagonal includes the cell corresponding to row 1 and column 1 (having a value of 1), the cell corresponding to row 2 and column 2 (having a value of 1), the cell corresponding to row 3 and column 3 (having a value of 0), and the cell corresponding to row 4 and column 4 (having a value of 0). The cell corresponding to row 3 and column 3 has a 0 value, as does the cell corresponding to row 4 and column 4 As such, the column 3 and the column 4 (which contain these 0 values in the diagonal of the matrix in reduced-echelon form shown in Table 2) may be identified as being redundant columns. Accordingly, the electronic modules corresponding to the columns 3 and 4 may be identified as being redundant electronic modules.

Note that the number of non-redundant columns may also be determined by the number of leading 1s in the diagonal of the matrix in the reduced row echelon form. Using the example of Table 2 above, there are two leading 1s in the diagonal of the matrix—in column 1 and column 2. Therefore, the number of non-redundant columns (e.g., independent and cannot be duplicated by other columns) in the above example is two. To further illustrate this point, Table 3 lists a matrix in reduced row echelon form, where all the columns are independent, meaning that none of the columns is redundant.

TABLE 3

| Status/Electronic Module | 1 | 2 | 3 | 4 |
|---|---|---|---|---|
| 1 | 1 | 0 | 0 | 0 |
| 2 | 0 | 1 | 0 | 0 |
| 3 | 0 | 0 | 1 | 0 |
| 4 | 0 | 0 | 0 | 1 |
| 5 | 0 | 0 | 0 | 0 |
| 6 | 0 | 0 | 0 | 0 |

The diagonal of the matrix in Table 3 includes all 1s but no 0s. Therefore, all four of the columns (e.g., all of the electronic modules) are independent and cannot be duplicated by other columns. This means that none of the electronic modules in the hypothetical example corresponding to Table 3 can be identified as redundant.

The example matrices discussed above have binary values of 0s and 1s. However, the various concepts of the present disclosure may apply to non-binary matrices as well. For example, a matrix may have any integer value or a decimal value. In some embodiments, these integer or decimal values of the non-binary matrices may represent the respective weightings of the electronic modules. For example, a first electronic module that is more important than a second electronic module may have a greater weighting, and therefore a greater value than the second electronic module (e.g., a value of 5 vs a value of 2). In other embodiments, the integer or decimal values of the non-binary matrices may represent the specific measurements made by the electronic modules. For example, a value of 25.3 may represent a first temperature measured by a first temperature sensor as an embodiment of a first electronic module, a value of −4 may represent a second temperature measured by a second temperature sensor as an embodiment of a second electronic module, a value of 54 may represent an acceleration measured by an accelerometer as an embodiment of a third electronic module, and a value of 12.22 may be a pressure measured by a pressure sensor as an embodiment of a fourth electronic module. Regardless of what the non-binary values represent, a redundant column can still be identified from the non-binary matrix by determining that the redundant column can be constructed as a linear combination of other columns in the non-binary matrix.

As a simple example, Table 4 illustrates a non-binary matrix having 6 rows and 3 columns.

TABLE 4

| Status/Electronic Module | 1 | 2 | 3 |
|---|---|---|---|
| 1 | −2 | 0.5 | −2.5 |
| 2 | 1 | 0.5 | 3.5 |
| 3 | −2 | 0 | −4 |
| 4 | 1 | 0.75 | 4.25 |
| 5 | −2 | 0.25 | −3.25 |
| 6 | 1 | 0 | 2 |

Using arbitrary non-zero coefficients $c_1$, $c_2$, $c_3$, a determination is made as to whether there exists a linear combination of the columns (expressed as $R_1$, $R_2$, and $R_3$ for the three columns, respectively) such that their sum is equal to zero:

$$c_1 \cdot R_1 + c_2 \cdot R_2 + c_3 \cdot R_3 = 0$$

For the above equation to hold true, one of the columns is a linear combination of the other columns and is therefore redundant. For example, column $R_3$ would be redundant if there exists non-zero values for $c_1$, $c_2$, $c_3$ for the above equation to hold true—meaning that the column $R_3$ could be represented as a linear combination of the columns $R_1$ and $R_2$. Solving for this equation:

$$c_1 \cdot \begin{pmatrix} -2 \\ 1 \\ -2 \\ 1 \\ -2 \\ 1 \end{pmatrix} + c_2 \cdot \begin{pmatrix} 0.5 \\ 0.5 \\ 0 \\ 0.75 \\ 0.25 \\ 0 \end{pmatrix} + c_3 \cdot \begin{pmatrix} -2.5 \\ 3.5 \\ -4 \\ 4.25 \\ -3.25 \\ 2 \end{pmatrix} = 0,$$

The columns $R_1$, $R_2$, and $R_3$ can also be expressed with the following matrix:

$$\begin{pmatrix} -2 & 0.5 & -2.5 \\ 1 & 0.5 & 3.5 \\ -2 & 0 & -4 \\ 1 & 0.75 & 4.25 \\ -2 & 0.25 & -3.25 \\ 1 & 0 & 2 \end{pmatrix}$$

By performing matrix operations, such as the Gaussian Elimination algorithm to the above matrix, a reduced row echelon form matrix is obtained below:

$$\begin{pmatrix} 1 & 0 & 2 \\ 0 & 1 & 3 \\ 0 & 0 & 0 \\ 0 & 0 & 0 \\ 0 & 0 & 0 \\ 0 & 0 & 0 \end{pmatrix}$$

Assuming $C_3 = t$, this system of linear equations has the following nontrivial solution:

$$c_2 + 3c_3 = 0 \rightarrow c_2 = -3t$$

$$c_1 + 2c_3 = 0 \rightarrow c_1 = -2t$$

Therefore, for any t≠0, the equation can be solved if:

$$-2t \cdot \begin{pmatrix} -2 \\ 1 \\ -2 \\ 1 \\ -2 \\ 1 \end{pmatrix} - 3t \cdot \begin{pmatrix} 0.5 \\ 0.5 \\ 0 \\ 0.75 \\ 0.25 \\ 0 \end{pmatrix} + t \cdot \begin{pmatrix} -2.5 \\ 3.5 \\ -4 \\ 4.25 \\ -3.25 \\ 2 \end{pmatrix} = 0$$

For example, for t=−1, the following may be obtained.

$$2 \cdot \begin{pmatrix} -2 \\ 1 \\ -2 \\ 1 \\ -2 \\ 1 \end{pmatrix} + 3 \cdot \begin{pmatrix} 0.5 \\ 0.5 \\ 0 \\ 0.75 \\ 0.25 \\ 0 \end{pmatrix} = \begin{pmatrix} -2.5 \\ 3.5 \\ -4 \\ 4.25 \\ -3.25 \\ 2 \end{pmatrix}$$

This demonstrates that the column $R_3$ is a linear combination of the columns $R_1$ and $R_2$:

$$2R_1 + 3R_2 = R_3$$

Below is the full solution of the matrix operations performed in the above example to reduce the non-binary matrix of Table 4 in the reduced row echelon form:

$$\begin{pmatrix} -2 & 0.5 & -2.5 \\ 1 & 0.5 & 3.5 \\ -2 & 0 & -4 \\ 1 & 0.75 & 4.25 \\ -2 & 0.25 & -3.25 \\ 1 & 0 & 2 \end{pmatrix} \begin{array}{l} R_2: R_2 + \frac{1}{2}R_1 \\ R_3: R_3 - R_1 \\ R_4: R_4 + \frac{1}{2}R_1 \\ R_5: R_5 - R_1 \\ R_6: R_6 + 0.5R_1 \end{array} \xrightarrow{} \begin{pmatrix} -2 & 0.5 & -2.5 \\ 0 & 0.75 & 2.25 \\ 0 & -0.5 & -1.5 \\ 0 & 1 & 3 \\ 0 & -0.25 & -0.75 \\ 0 & 0.25 & 0.75 \end{pmatrix}$$

$$\begin{pmatrix} -2 & 0.5 & -2.5 \\ 0 & 1 & 3 \\ 0 & -0.5 & -1.5 \\ 0 & 0.75 & 2.25 \\ 0 & -0.25 & -0.75 \\ 0 & 0.25 & 0.75 \end{pmatrix} \begin{array}{l} R_1: -0.5R_1 \\ R_3: R_3 + \frac{1}{2}R_2 \\ R_4: R_4 - 0.75R_2 \\ R_5: R_5 + 0.25R_2 \\ R_6: R_6 - 0.25R_2 \end{array} \xrightarrow{} \begin{pmatrix} 1 & -0.25 & 1.25 \\ 0 & 1 & 3 \\ 0 & 0 & 0 \\ 0 & 0 & 0 \\ 0 & 0 & 0 \\ 0 & 0 & 0 \end{pmatrix}$$

$$\begin{pmatrix} 1 & 0 & 2 \\ 0 & 1 & 3 \\ 0 & 0 & 0 \\ 0 & 0 & 0 \\ 0 & 0 & 0 \\ 0 & 0 & 0 \end{pmatrix}$$

Regardless of whether the matrices are binary or non-binary, once the redundant columns are identified, a determination may be made as to whether an incremental value provided by the redundant electronic module (corresponding to the redundant column) to the overall vehicle system 100 justifies its implementation in the vehicle system 100. For example, the incremental value provided by the redundant electronic module may be compared with a predefined threshold. If the incremental value provided by the redundant electronic module meets or exceeds the predefined threshold, then the redundant electronic module may still be kept within the vehicle system 100. On the other hand, if the incremental value provided by the redundant electronic module fails to meet the predefined threshold, then the redundant electronic module may be removed from the vehicle system 100.

In some embodiments, the identification of the redundant electronic modules, the evaluation of the incremental value provided by the redundant electronic modules, and the determination of whether to remove the redundant electronic modules from the vehicle system are performed during a development phase of the vehicle system 100. In some embodiments, the development phase may include a computer simulation environment, such that the data gathered regarding the electronic modules are computer simulation data. In other embodiments, the development phase may include testing data of a prototype vehicle in the real world, such that the data gathered regarding the electronic modules include real world non-simulation data. It is understood that in both the computer simulation environment or in the real-world prototype implementation of the vehicle system 100, various electronic modules can be added or removed, and their data accessed to construct the matrices discussed above in order to identify which of the electronic modules may be redundant.

It is also understood that although columns are used as example vectors in a matrix to identify the redundant electronic modules, the same concepts discussed above may be applied to rows too. For example, a matrix may be constructed where the rows represent the electronic modules, and where the columns represent the monitored statuses (e.g., events). In other words, the matrices discussed above may be transposed such that the rows become columns, and the columns become rows. In that case, a redundant row may still be identified as a linear combination of other rows, and the electronic module corresponding to that redundant row may be identified as the redundant electronic module.

Figure 2:
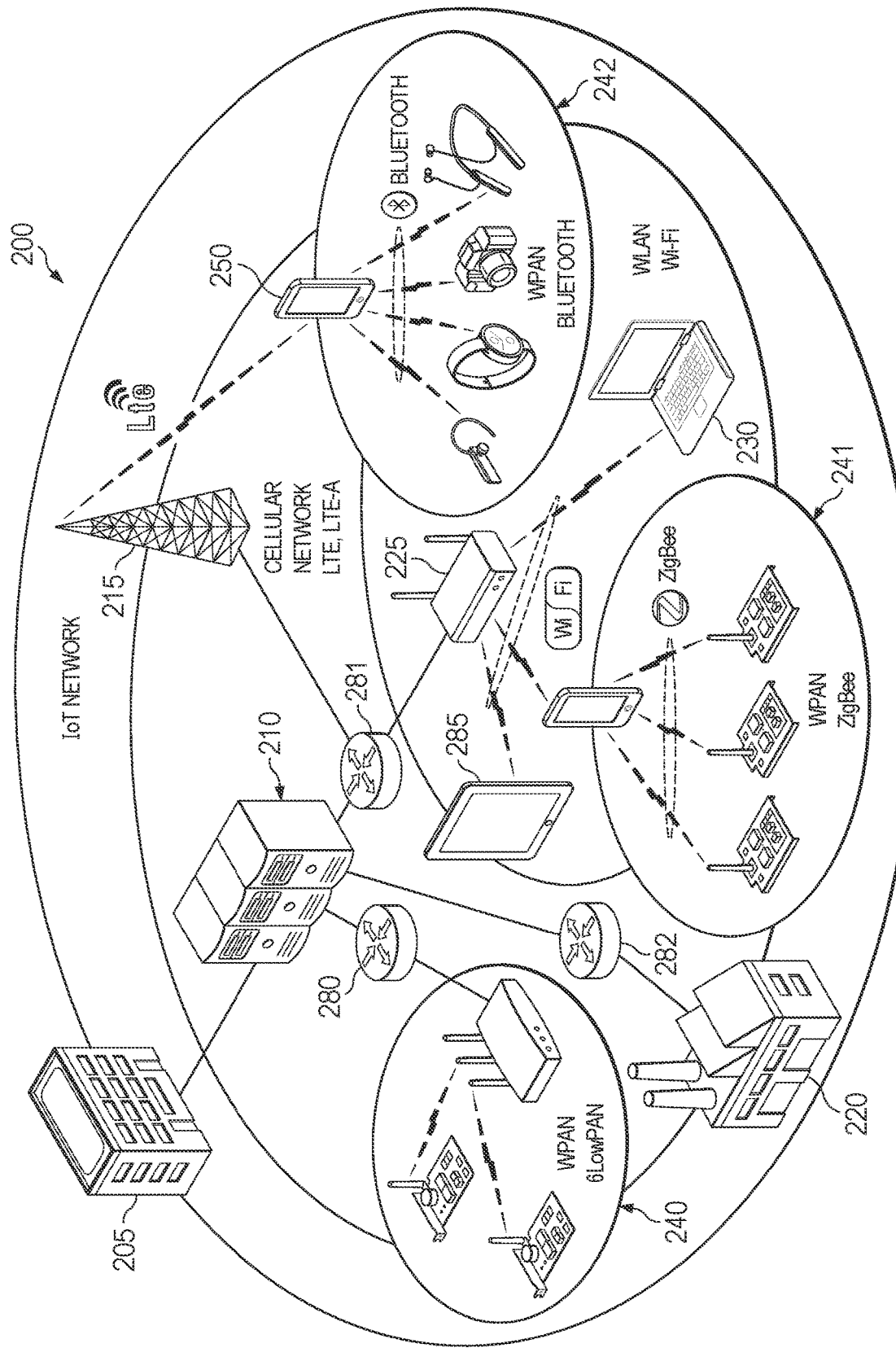

The concepts discussed above may also apply to interconnected networks other than the vehicle system 100 of FIG. 1. For example, FIG. 2 illustrates an Internet of Things (IoT) network 200, which comprises a plurality of devices that are electronically interconnected together over the Internet or other suitable wireless communication technologies. The wireless communication technologies may include cellular communication technologies such as Long Term Evolution (LTE) or LTE Advanced (LTE-A), millimeter wave wireless technologies (e.g., 5G ($5^{th}$ generation) cellular network communications), WI-FI or Wireless Local Area Network (WLAN) based on the Institute of Electrical and Electronics Engineers (IEEE) 802.11 standard, the Wireless Personal Area Network (WPAN) based on the IEEE 802.15 standard, Bluetooth based on the IEEE 802.15.1 standard, IP6 over Low-Power Wireless Personal Area Networks (6LowPAN) or ZigBee networks based on the IEEE 802.15.4 standard, etc. The interconnected devices on the IoT network 200 may include desktop and laptop personal computers, tablet computers, mobile telephones, routers, cellular towers, servers, network cards, digital cameras, wearable devices, etc.

In the simplified example of FIG. 2, the IoT network 200 includes a data center 205 (that houses a plurality of computers), a computer server 210, a cellular network tower 215 (e.g., an LTE or LTE-A base-station), a warehouse 220, a router 225, and a laptop computer 230. The IoT network 200 also includes a WPAN 240 (e.g., a 6LowPAN), a WPAN 241 (e.g., a ZigBee network), and a Bluetooth network 242. The WPAN 240 and the WPAN 241 may each include routers or network interface cards that are coupled to a router or a mobile phone via a wireless interface or a wired interface. The Bluetooth network 242 may include one or more mobile phones 250 that may be wirelessly coupled to a plurality of other devices, such as a watch, a digital camera, or a headset. The data center 205 may be coupled to the computer server 210 through the Internet via wired cables or through a suitable wireless protocol. The computer server 210 may be coupled to the WPAN 240, the cellular network tower 215, and the warehouse 220 through network relays 280, 281, and 282, respectively. The network relay 281 may also be used to couple the computer server 210 to the router 225. The router 225 is also coupled to the WPAN 241 and a tablet computer 285. The mobile phone 250 of the Bluetooth network 242 is also coupled to the cellular network tower 215 via the LTE protocol. In this manner, all the devices illustrated in the above simplified example are interconnected together.

Electronic modules (e.g., sensors) may be implemented in any of these devices, and/or each of these interconnected devices may be considered an electronic module itself. The electronic modules may monitor the status (e.g., a health of a wireless signal, a battery level, a speed of data traffic, a temperature) of the devices of the IoT network 200. The monitored statuses may indicate events that occur on the IoT network 200, for example, a disconnection of a device or a sub-network, a denial or service, a reduction in bandwidth or speed below a predefined threshold, or a number of data packets transmitted beyond a predefined threshold.

As discussed above, redundant electronic modules of the IoT network 200 may be identified by collecting data pertaining to the electronic modules, constructing a matrix based on the collected data, manipulating the matrix (e.g., by performing a Gaussian Elimination algorithm), and then identifying columns of the matrix that meet predefined conditions (e.g., columns that do not include leading ones in the diagonal of a matrix in a reduced echelon form). Depending on the incremental value provided by a redundant electronic module to the IoT network 200, the redundant electronic module may either be kept within the IoT network 200 or removed from the IoT network 200. For example, the above process may identify that one of the network interface cards in the WPAN 240 as being redundant, because the router in WPAN can connect to one or more of the other network interface cards and not lose any functionality. Therefore, the identified redundant network interface card (as an example of the redundant electronic module) may be removed from the WPAN 240. As another example, the above process may identify that one of the wireless routers in the WPAN 241 as being redundant, and therefore the identified redundant wireless routers (as an example of the redundant electronic module) may be removed from the WPAN 241. As yet another example, the above process may identify that one of the computers in the data center 205 as being redundant, and therefore the identified redundant computer (as an example of the redundant electronic module) may be removed from the data center 205. As a further example, in embodiments where the Bluetooth network 242 has multiple mobile phones 250, the above process may identify one of the mobile phones 250 as being redundant, and therefore the identified redundant mobile phone 250 (as an example of the redundant electronic module) may be removed from the Bluetooth network 242.

Figure 3:
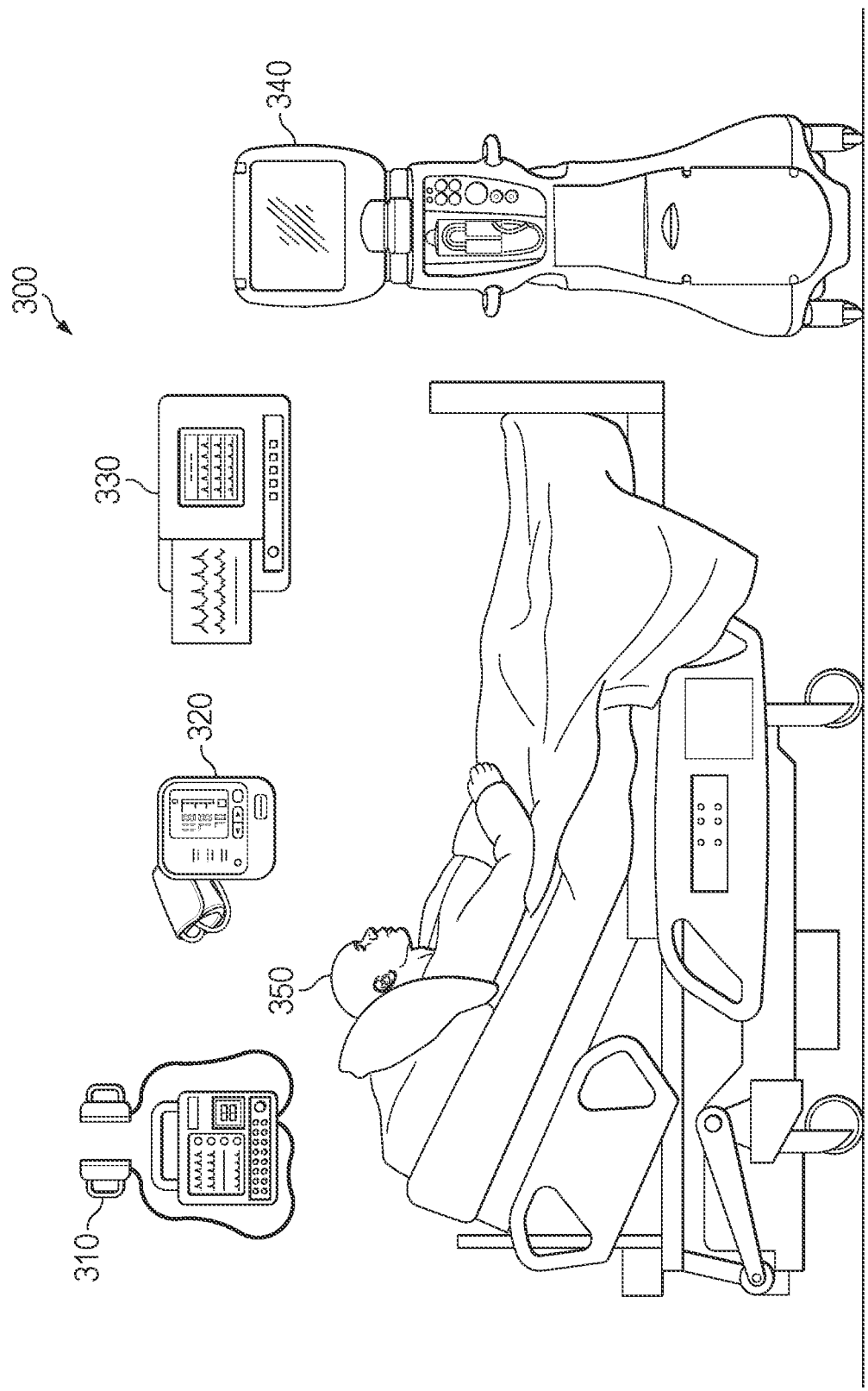

FIG. 3 illustrates a medical device system 300 as yet another example of an interconnected network. The medical device system 300 includes one or more medical devices, for example, medical devices 310, 320, 330, and 340. Non-limiting examples of the medical devices 310-340 may include ultrasound machines, Magnetic Resonance Imaging (MRI) machines, X-ray scanners, Computed Tomography (CT) scanners, ventilators, incubators, dialysis machines, defibrillators, infusion pumps, medical lasers, blood pressure monitors, heart rate monitors, etc.

Electronic modules (e.g., sensors) may be implemented inside these medical devices 310-340 to monitor the status of an entity, such as a person 350 (e.g., a patient) whose body is coupled to one or more of the medical devices 310-340. For example, a blood pressure or a heart rate of the person 350 may be monitored by the electronic modules. Events associated with the person 350 may be detected based on the monitored status of the person 350, for example, a person undergoing a heart attack or going into shock. The electronic modules may also be used to monitor the status of the medical devices 310-340 themselves, for example, to detect whether the medical devices 310-340 are overheating, losing a wireless signal coverage, battery level dropping below a predefined threshold, and/or malfunctioning. In some embodiments, one or more medical devices 310-340 themselves may be considered as an electronic module according to the various aspects of the present disclosure.

As discussed above, redundant electronic modules of the medical device system 300 may be identified by collecting data pertaining to the electronic modules, constructing a matrix based on the collected data, manipulating the matrix (e.g., by performing a Gaussian Elimination algorithm), and then identifying columns of the matrix that meet predefined conditions (e.g., columns that do not include leading ones in the diagonal of a matrix in a reduced echelon form). Depending on the incremental value provided by a redundant electronic module to the medical device system 300, the redundant electronic module may either be kept within the medical device system 300 or removed from the medical device system 300. For example, the above process may identify that a standalone heart rate monitor (as an example one of the medical devices 310-340) is redundant, because its functionality (e.g., monitoring a heart rate of the person 350) is duplicated by one or more other medical devices 310-340. In that case, the standalone heart rate monitor may be removed from the medical device system 300. As another example, the above process may also identify the dedicated heart rate monitor as being redundant, because its usefulness in predicting certain events (e.g., a heart attack) is duplicated by other medical devices 310-340, even if these other medical devices 310-340 do not directly measure the heart rate of the person 350. In other words, one or more of the other medical devices 310-340 may measure other biometric parameters (e.g., other than the heart rate) of the person 350, which may be used to consistently predict an event such as the heart attack. In that case, the dedicated heart rate monitor may not be needed, since the medical device system 300 does not need it to perform the intended tasks (e.g., predicting or detecting heart attacks).

Figure 4:
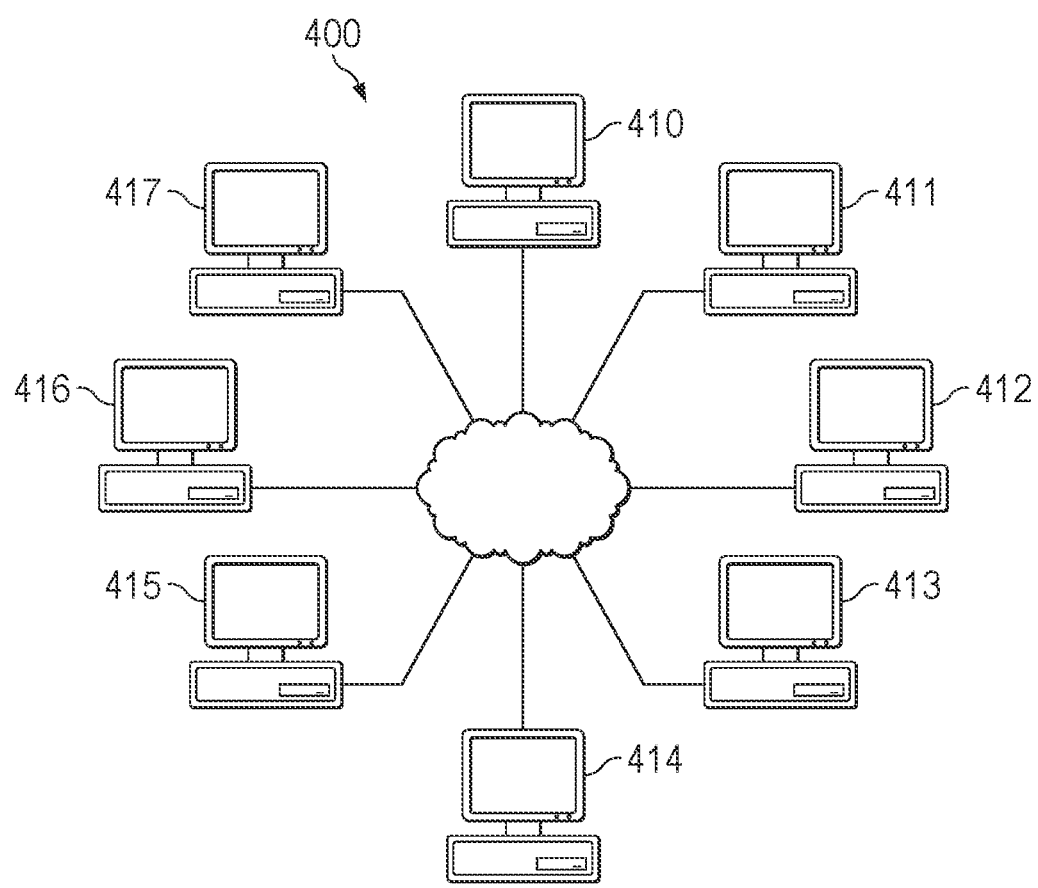

FIG. 4 illustrates a network security system 400 as yet another example of an interconnected network. The network security system 400 includes a plurality of networked devices 410, 411, 412, 413, 414, 415, 416, and 417. The networked devices 410-417 may include personal desktop or laptop computers, tablet computers, mobile telephones, computer servers, network routers, etc. Electronic modules may also be implemented within the networked devices 410-417, for example, in the form of a hardware device or as a software program. For example, the electronic modules may comprise a transceiver configured to transmit and receive data, a network tap configured to monitor eyewitness on a local network, a data packet analyzer configured to intercept and/or log data traffic that passes over at least a part of a network, a firewall (e.g., a Virtual Private Network (VPN)) that monitors attempts to gain access to components (e.g., an operating system) of a network and/or blocks unwanted incoming data traffic from untrusted sources, a set of network security rules specifying what actions to take in response to a detected condition, etc. Via the electronic modules, the network security system 400 may protect the devices 410-417 from attacks from external devices.

As discussed above, redundant electronic modules of the network security system 400 may be identified by collecting data pertaining to the electronic modules, constructing a matrix based on the collected data, manipulating the matrix (e.g., by performing a Gaussian Elimination algorithm), and then identifying columns of the matrix that meet predefined conditions (e.g., columns that do not include leading ones in the diagonal of a matrix in a reduced echelon form). Depending on the incremental value provided by a redundant electronic module to the network security system 400, the redundant electronic module may either be kept within the network security system 400 or removed from the network security system 400. For example, the above process may identify that one of the firewalls (e.g., in the case of having multiple firewalls) as being redundant, because the data traffic blocked by the redundant firewall is blocked by one or more other firewalls of the network security system 400. Therefore, the identified redundant firewall (as an example of the redundant electronic module) may be removed from the network security system 400.

Figure 5:
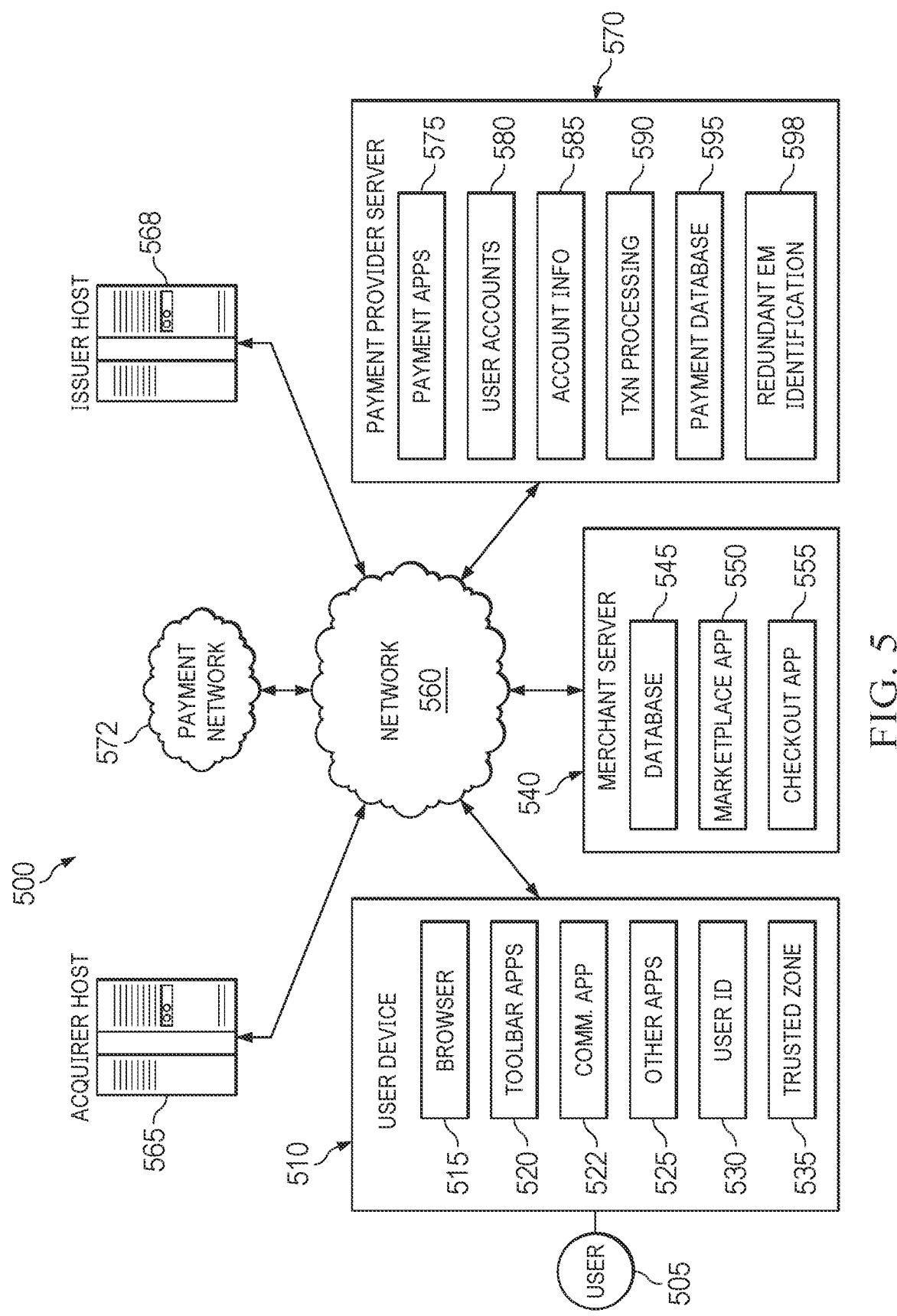

FIG. 5 illustrates an electronic transactions system 500 as yet another example of an interconnected network. The electronic transaction system 500 is suitable for conducting electronic transactions according to the various aspects of the present disclosure. The electronic transaction system 500 may comprise or implement a plurality of hardware devices and/or software components that operate on the hardware devices to perform various payment transactions or processes. Exemplary devices may include, for example, standalone and enterprise-class servers operating a server OS such as a MICROSOFT™ OS, a UNIX™ OS, a LINUX™ OS, or another suitable server-based OS. It can be appreciated that the servers illustrated in FIG. 5 may be deployed in other ways and that the operations performed, and/or the services provided by such servers may be combined or separated for a given implementation and may be performed by a greater number or fewer number of servers. One or more servers may be operated and/or maintained by the same or different entities. Exemplary devices may also include mobile devices, such as smartphones, tablet computers, or wearable devices. In some embodiments, the mobile devices may include an APPLE™ IPHONE™, an ANDROID™ smartphone, or an APPLE™ IPAD™, etc.

In the embodiment shown in FIG. 5, the electronic transaction system 500 may include a user device 510, a merchant server 540, a payment provider server 570, an acquirer host 565, an issuer host 568, and a payment network 572 that are in communication with one another over a network 560. The payment provider server 570 may be maintained by a payment service provider, such as PAYPAL™, Inc. of San Jose, Calif. A user 505, such as a consumer, may utilize user device 510 to perform an electronic transaction using payment provider server 570. For example, user 505 may utilize user device 510 to receive offers generated by merchants, for example a merchant associated with the merchant server 540. The user 505 may then use the user device 510 to accept and/or redeem the offers, either by visiting the merchant's web site (provided by merchant server 540) or the merchant's brick-and-mortar store. Further, user 505 may utilize user device 510 to initiate a payment transaction, receive a transaction approval request, or reply to the request. Note that a transaction, as used here, refers to any suitable action performed using the user device, including payments, transfer of information, display of information, etc. Although only one merchant server is shown, a plurality of merchant servers may be utilized if the user is purchasing products from multiple merchants.

User device 510, merchant server 540, payment provider server 570, acquirer host 565, issuer host 568, and payment network 572 may each include one or more electronic processors, electronic memories, and other appropriate electronic components for executing instructions such as program code and/or data stored on one or more computer readable mediums to implement the various applications, data, and steps described here. For example, such instructions may be stored in one or more computer readable media such as memories or data storage devices internal and/or external to various components of system 500, and/or accessible over network 560.

Network 560 may be implemented as a single network or a combination of multiple networks. For example, in various embodiments, network 560 may include the Internet or one or more intranets, landline networks, wireless networks, and/or other appropriate types of networks.

User device 510 may be implemented using any appropriate hardware and software configured for wired and/or wireless communication over network 560. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an IPHONE™ or IPAD™ from APPLE™.

User device 510 may include one or more browser applications 515 which may be used, for example, to provide a convenient interface to permit user 505 to browse information available over network 560. For example, in one embodiment, browser application 515 may be implemented as a web browser configured to view information available over the Internet, such as a user account for online shopping and/or merchant sites for viewing and purchasing goods and/or services.

Still referring to FIG. 5, the user device 510 may also include one or more toolbar applications 520 which may be used, for example, to provide client-side processing for performing desired tasks in response to operations selected by user 505. In one embodiment, toolbar application 520 may display a user interface in connection with browser application 515.

User device 510 also may include other applications 525 to perform functions, such as email, texting, voice and IM applications that allow user 505 to send and receive emails, calls, and texts through network 560, as well as applications that enable the user to communicate, transfer information, make payments, and otherwise utilize a digital wallet through the payment provider as discussed here. In some embodiments, these other applications 525 may include a mobile application downloadable from an online application store (e.g., from the APPSTORE™ by APPLE™). The mobile application may be developed by the payment provider or by another entity, such as an offer aggregation entity. In some embodiments, the execution of the mobile application may be done locally without contacting an external server such as the payment provider server 570. In other embodiments, one or more processes associated with the execution of the mobile application may involve or be performed in conjunction with the payment provider server 570 or another entity. In addition to allowing the user to receive, accept, and redeem offers, such a mobile application may also allow the user 505 to send payment transaction requests to the payment service provider server 570, which includes communication of data or information needed to complete the request, such as funding source information.

User device 510 may include one or more user identifiers 530 which may be implemented, for example, as operating system registry entries, cookies associated with browser application 515, identifiers associated with hardware of user device 510, or other appropriate identifiers, such as used for payment/user/device authentication. In one embodiment, user identifier 530 may be used by a payment service provider to associate user 505 with a particular account maintained by the payment provider. A communications application 522, with associated interfaces, enables user device 510 to communicate within system 500.

In conjunction with user identifiers 530, user device 510 may also include a trusted zone 535 owned or provisioned by the payment service provider with agreement from a device manufacturer. The trusted zone 535 may also be part of a telecommunications provider SIM that is used to store appropriate software by the payment service provider capable of generating secure industry standard payment credentials as a proxy to user payment credentials based on user 505's credentials/status in the payment providers system/age/risk level and other similar parameters.

Still referring to FIG. 5, the merchant server 540 may be maintained, for example, by a merchant or seller offering various products and/or services. The merchant may have a physical point-of-sale (POS) store front. The merchant may be a participating merchant who has a merchant account with the payment service provider. Merchant server 540 may be used for POS or online purchases and transactions. Generally, merchant server 540 may be maintained by anyone or any entity that receives money, which includes charities as well as retailers and restaurants. For example, a purchase transaction may be payment or gift to an individual. Merchant server 540 may include a database 545 identifying available products and/or services (e.g., collectively referred to as items) which may be made available for viewing and purchase by user 505. Accordingly, merchant server 540 also may include a marketplace application 550 which may be configured to serve information over network 560 to browser 515 of user device 510. In one embodiment, user 505 may interact with marketplace application 550 through browser applications over network 560 in order to view various products, food items, or services identified in database 545.

Merchant server 540 also may include a checkout application 555 which may be configured to facilitate the purchase by user 505 of goods or services online or at a physical POS or store front. Checkout application 555 may be configured to accept payment information from or on behalf of user 505 through payment provider server 570 over network 560. For example, checkout application 555 may receive and process a payment confirmation from payment provider server 570, as well as transmit transaction information to the payment provider and receive information from the payment provider (e.g., a transaction ID). Checkout application 555 may be configured to receive payment via a plurality of payment methods including cash, credit cards, debit cards, checks, money orders, or the like.

Payment provider server 570 may be maintained, for example, by an online payment service provider which may provide payment between user 505 and the operator of merchant server 540. In this regard, payment provider server 570 may include one or more payment applications 575 which may be configured to interact with user device 510 and/or merchant server 540 over network 560 to facilitate the purchase of goods or services, communicate/display information, and send payments by user 505 of user device 510.

The payment provider server 570 also maintains a plurality of user accounts 580, each of which may include account information 585 associated with consumers, merchants, and funding sources, such as credit card companies. For example, account information 585 may include private financial information of users of devices such as account numbers, passwords, device identifiers, usernames, phone numbers, credit card information, bank information, or other financial information which may be used to facilitate online transactions by user 505. Advantageously, payment application 575 may be configured to interact with merchant server 540 on behalf of user 505 during a transaction with checkout application 555 to track and manage purchases made by users and which and when funding sources are used.

A transaction processing application 590, which may be part of payment application 575 or separate, may be configured to receive information from a user device and/or merchant server 540 for processing and storage in a payment database 595. Transaction processing application 590 may include one or more applications to process information from user 505 for processing an order and payment using various selected funding instruments, as described here. As such, transaction processing application 590 may store details of an order from individual users, including funding source used, credit options available, etc. Payment application 575 may be further configured to determine the existence of and to manage accounts for user 505, as well as create new accounts if necessary.

The payment provider server 570 may also include a redundant electronic module identification module 598 that is configured to identify redundant electronic modules of the system 500. In some embodiments, the electronic modules of the system 500 may include a set of rules that monitor statuses (e.g., by detecting a condition or an event) of transactions occurring within the system 500 and perform actions based on the monitored statuses. For example, the statuses may include login attempts, fund withdrawal attempts, username changes, incorrect password entries, etc. In some embodiments, the rules comprise fraud detection and/or prevention rules. Non-limiting examples of the rules may include:

- If a score outputted by a fraud model is greater than a predefined threshold, then at least temporarily suspend the transaction.
- If a user has failed to provide correct authentication credentials an N number of times, at least temporarily suspend an account of the user.
- If a detection is made that a user is attempting to log in to a user account from a VPN, then implement additional security measures for the user account.
- If a user has not logged in to his/her account for over a predetermined period of time (e.g., over a month), then perform a two-step authentication the next time the user attempts to log in to his/her account.

Similar to the examples of FIGS. 1-4 discussed above, the data pertaining to these rules can be collected over a period of time. The collected data may indicate which rule(s) were triggered for each event, which may then be used to construct the matrix discussed above. For example, the rows of the matrix may correspond to different events, and the columns of the matrix may correspond to different rules (e.g., as embodiments of the electronic modules). A value of 1 in a cell of the matrix means that the corresponding rule was triggered for the corresponding event, and a value of 0 in a cell of the matrix means that the corresponding rule was not triggered for the corresponding event. In some embodiments, the matrix is non-binary. For example, the rules that are more important than other rules may be given a higher weighting (e.g., a greater value), and vice versa.

Regardless of whether the matrix is binary or not, it may be manipulated (e.g., via Gaussian Elimination) to obtain a reduced echelon form of the matrix. Using the reduced echelon form of the matrix, redundant columns (and therefore redundant rules) can be identified. The redundant electronic module identification module 598 may include the hardware (e.g., computer processors and computer memory) and software for collecting the data pertaining to the rules, constructing the matrix, manipulating the matrix, and identifying the redundant rules based on the manipulated matrix.

Still referring to FIG. 5, the payment network 572 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 565 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 568 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

It is also understood that machine learning may be used to perform certain aspects of the present disclosure. For example, the length of the period of time over which the data pertaining to the electronic modules is collected may be determined at least in part via machine learning. In that regard, if this time period is too short, then the data collected may not be sufficiently accurate to determine which of the electronic modules are truly redundant. In other words, even if a redundant electronic module is identified based on a matrix constructed using a small sample size, the seemingly redundant electronic module may actually have functionalities that cannot be duplicated by other electronic modules, and/or that it may be a mere coincidence that the functionalities of the redundant electronic module appear to be duplicated by other electronic modules. On the other hand, while a longer-than-optimal data-collection time period may lead to accurate results, it constitutes a waste of resources, and it may unduly delay the removal of truly redundant electronic modules from an interconnected network.

Figure 6:
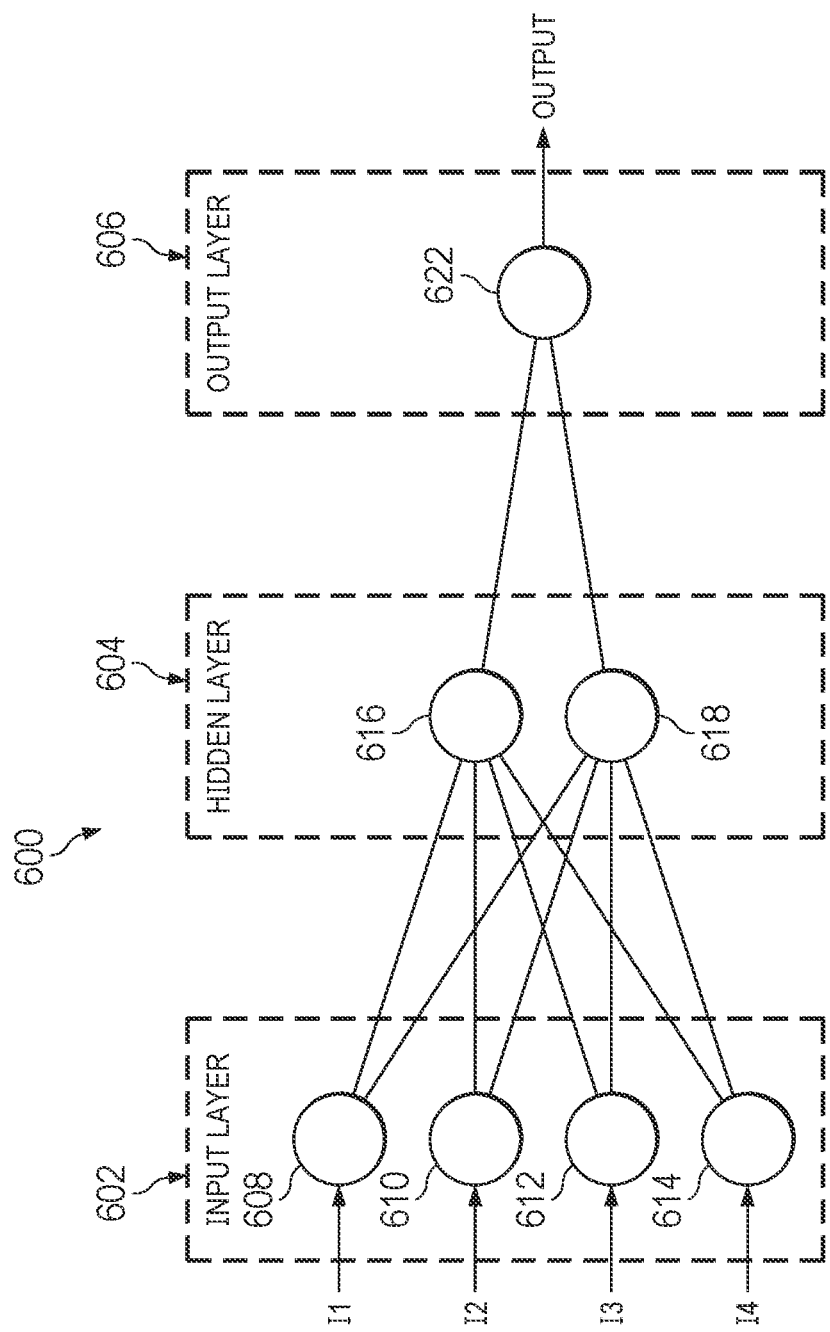
FIG. 6 illustrates an example neural network for machine learning.

Here, a machine learning process may be performed to determine the optimal length for the time period used to collect the data pertaining to the electronic modules in order to construct the matrix according to various aspect of the present disclosure. In some embodiments, such a machine learning process may be performed at least in part via an artificial neural network, which may be used to determine the optimum value of epsilon. In that regard, FIG. 6 illustrates an example artificial neural network 600. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the machine learning module 260, and the machine learning module 260 may include as many hidden layers as necessary. In this example, the artificial neural network 600 receives a set of input values and produces an output value. Each node in the input layer 602 may correspond to a distinct input value.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (e.g., input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the machine learning module 260, the output value produced by the artificial neural network 600 may indicate a likelihood of an event.

The artificial neural network 600 may be trained by using training data. For example, the training data herein may include the data pertaining to the electronic modules that is collected using various time period lengths. By providing training data to the artificial neural network 600, the nodes 616-618 in the hidden layer 604 may be trained (e.g., adjusted) such that an optimal output (e.g., determining an optimal value for the data-collection time period) is produced in the output layer 606 based on the training data. By continuously providing different sets of training data and penalizing the artificial neural network 600 when the output of the artificial neural network 600 is incorrect (e.g., when the identified redundant electronic module is inconsistent with whether that electronic module is actually redundant, etc.), the artificial neural network 600 (and specifically, the representations of the nodes in the hidden layer 604) may be trained to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm—which may be a non-probabilistic binary linear classifier—may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 7:
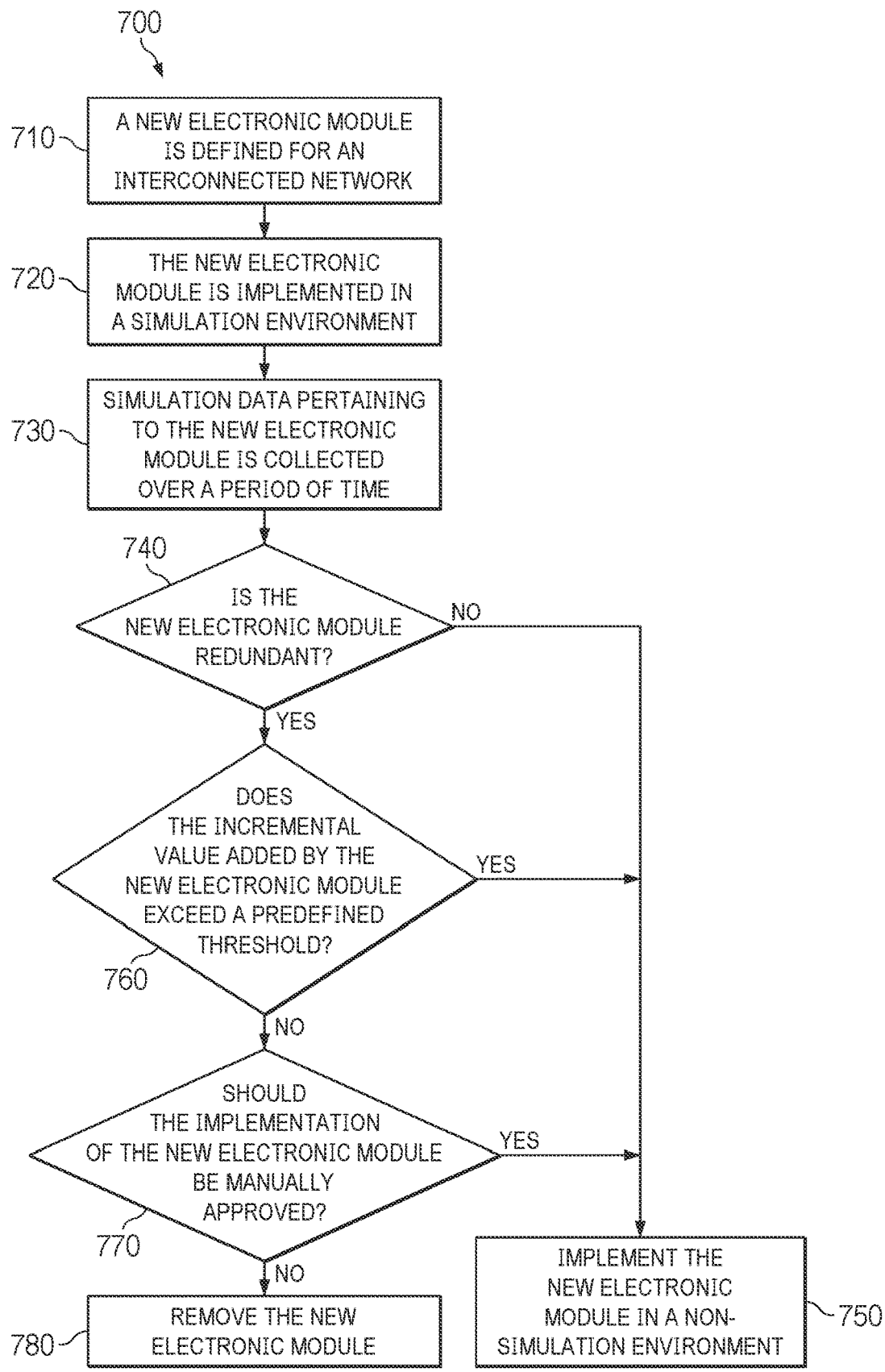
FIGS. 7-8 illustrate flowcharts of methods according to various aspects of the present disclosure.

FIG. 7 is a flowchart illustrating a method 700 according to various aspects of the present disclosure. The method 700 may be performed by a system that includes a processor and a non-transitory computer-readable medium associated with or managed by any of the entities or systems described herein. The computer-readable medium has instructions stored thereon, where the instructions are executable by the processor to cause the system to perform the various steps of the method 700.

In a step 710 of the method 700, a new electronic module is defined for an interconnected network. In some embodiments, the new electronic module may be a sensor. In other embodiments, the new electronic module may be a network security rule or a fraud-prevention rule.

In a step 720 of the method 700, the new electronic module is implemented in a simulation environment. For example, the simulation environment may include a computer model that demonstrates how the new electronic module would behave once it is implemented in the interconnected network.

In a step 730 of the method 700, simulation data pertaining to the new electronic module is collected over a period of time. In some embodiments, the period of time may be a predetermined period of time, for example, over a week. In other embodiments, the period of time may be determined via machine learning, as discussed above with reference to FIG. 6.

In a step 740 of the method 700, a decision is made as to whether the new electronic module is redundant. In some embodiments, the decision is made by constructing a matrix based on the simulation data collected in step 730, performing matrix operations (e.g., a Gaussian Elimination algorithm) to the matrix to transform the matrix to a reduced echelon form, and identifying redundant columns (which correspond to redundant electronic modules) based on the matrix in the reduced echelon form.

If the result from the step 740 is no, then the method 700 proceeds to step 750, in which the new electronic module is implemented as a part of the interconnected network in a non-simulation environment (e.g., an actual production environment in the real world).

If the result from the step 740 is yes, then the method 700 proceeds to step 760, in which another decision is made to determine whether the incremental value added by the new electronic module exceeds a predefined threshold.

If the result from the step 760 is yes, then the method 700 still proceeds to step 750. In other words, even if the new electronic module is redundant, it can still be implemented in the actual production environment as long as the incremental value added by the new electronic module exceeds the predefined threshold.

If the result from the step 760 is no, then the method 700 proceeds to step 770, in which another decision is made as to whether the implementation of the new electronic module should be manually approved. In some embodiments, the manual approval involves a decision made by appropriate human personnel.

If the result from the step 770 is yes, then the method 700 still proceeds to step 750. In other words, even if the new electronic module is redundant and lacks sufficient incremental value, it can still be implemented in the actual production environment as long as the appropriate personnel deems the implementation of the new electronic module worthy.

If the result from the step 770 is no, then the method 700 proceeds to step 780 to remove the new electronic module from the interconnected network. In other words, the new electronic module should not be implemented in the interconnected network.

Figure 8:
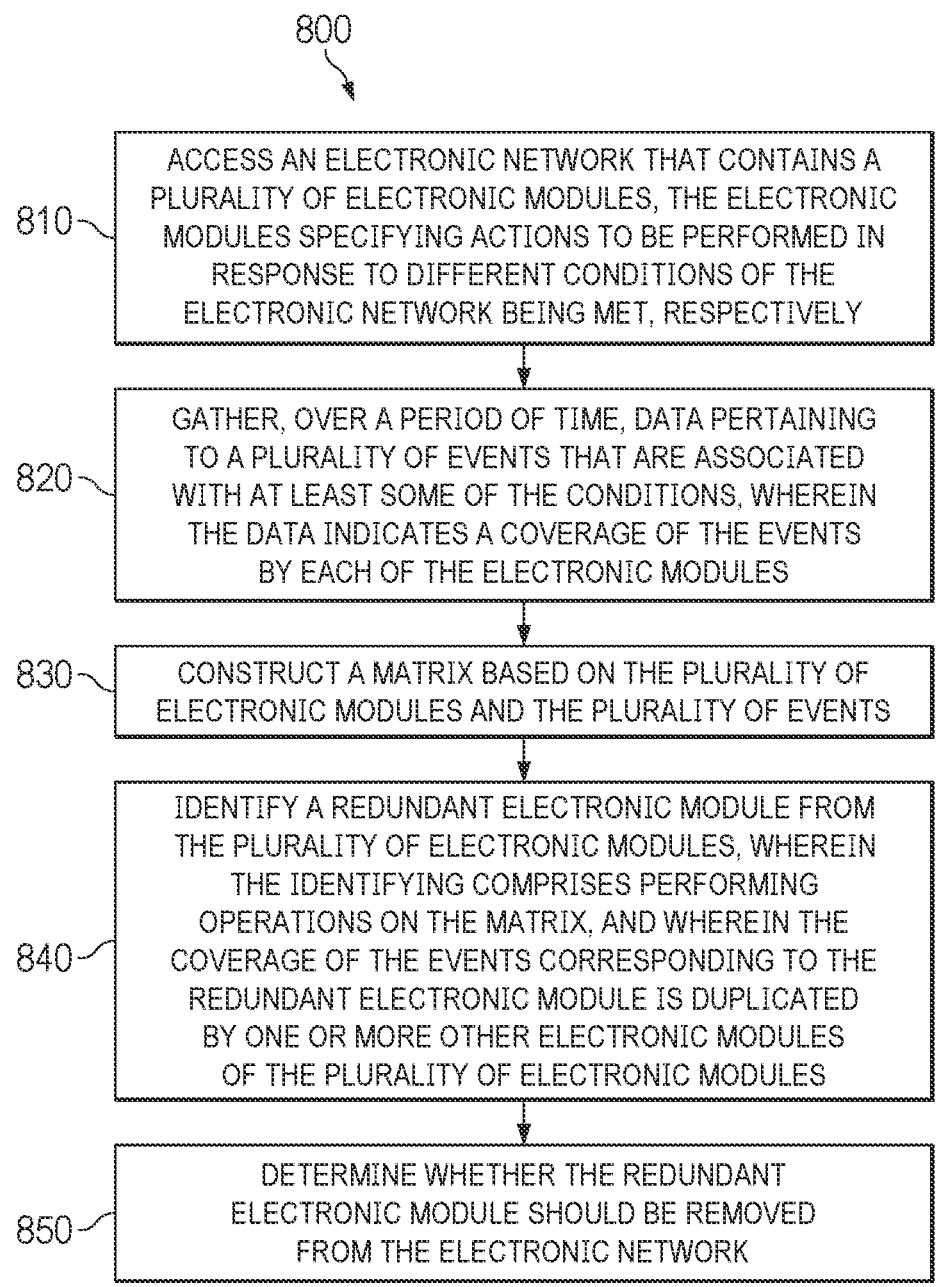

FIG. 8 is a flowchart illustrating a method 800 according to various aspects of the present disclosure. The method 800 may be performed by a system that includes a processor and a non-transitory computer-readable medium associated with or managed by any of the entities or systems described herein. The computer-readable medium has instructions stored thereon, where the instructions are executable by the processor to cause the system to perform the various steps of the method 800.

The method 800 includes a step 810 to access an electronic network that contains a plurality of electronic modules. The electronic modules specify actions to be performed in response to different conditions of the electronic network being met, respectively.

The method 800 includes a step 820 to gather, over a period of time, data pertaining to a plurality of events that are associated with at least some of the conditions. The data indicates a coverage of the events by each of the electronic modules.

The method 800 includes a step 830 to construct a matrix based on the plurality of electronic modules and the plurality of events.

The method 800 includes a step 840 to identify a redundant electronic module from the plurality of electronic modules. In some embodiments, the step 840 comprises performing operations on the matrix. The coverage of the events corresponding to the redundant electronic module is duplicated by one or more other electronic modules of the plurality of electronic modules.

The method 800 includes a step 850 to determine whether the redundant electronic module should be removed from the electronic network. It is understood that at least some of the steps 810-850 is performed by a computer system.

In some embodiments, the electronic network comprises a vehicle or an Internet of Things (IoT) network. The plurality of electronic modules comprise a plurality of electronic sensors implemented on the vehicle or the IoT network. Each of the electronic sensors is configured to monitor a status of the vehicle or the IoT network.

In some embodiments, the electronic network comprises a medical device system for a person or for an entity. The plurality of electronic modules comprise a plurality of electronic sensors implemented on the medical device system. Each of the electronic sensors is configured to monitor a status of the person or a status of the entity.

In some embodiments, the electronic network comprises an online transaction system. The plurality of electronic modules comprises a plurality of fraud prevention rules. Each of the fraud prevention rules is configured to monitor user activities of users of the online transaction system. Each of the fraud prevention rules is also configured to specify an action to be taken by the online transaction system in response to a predefined user activity being monitored.

In some embodiments, the electronic network comprises a network security system. The plurality of electronic modules comprises a plurality of network security rules. Each of the network security rules is configured to monitor data traffic on the network security system. Each of the network security rules is also configured to Each of the network security rules is configured to specify an action to be taken by the network security system in response to a predefined pattern of data traffic being monitored.

In some embodiments, the step 820 comprises gather simulation data in a computer simulation environment simulation environment. In some embodiments, the step 850 comprises determining whether the redundant electronic module should be removed from the electronic network before the plurality of electronic modules of the electronic network are deployed to an actual production environment.

In some embodiments, the data gathered indicates which subset of the plurality of electronic modules were triggered for each of the plurality of events.

In some embodiments, the operations performed on the matrix comprise a Gaussian elimination operation.

It is also understood that additional method steps may be performed before, during, or after the steps 810-850 discussed above. For example, the method 800 may include a step of determining, via a machine learning process, an optimized value for the period of time for which the data should be gathered. As another example, a determination is made, via a machine learning process, an optimized value for the period of time for which the data should be gathered, and the method 800 may include a step of removing the redundant electronic module from the electronic network in response to the determination that the incremental value provided by the redundant electronic module does not exceed the predefined threshold. For reasons of simplicity, other additional steps are not discussed in detail herein.

Figure 9:
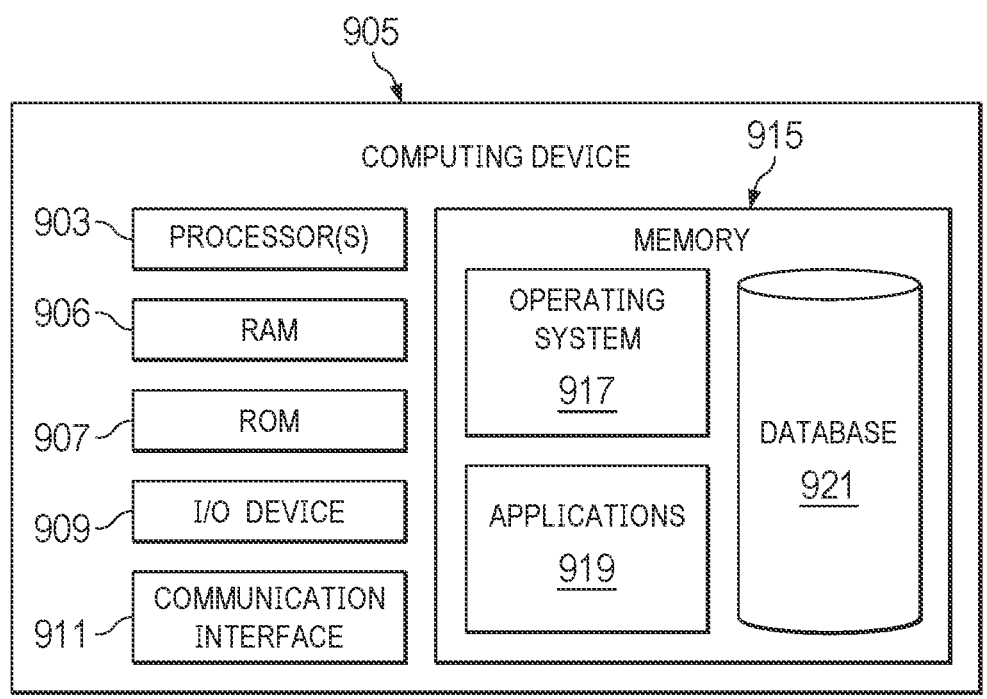
FIG. 9 illustrates an example computing architecture for performing various aspects of the present disclosure.

Turning now to FIG. 9, a computing device 905 that may be used with one or more of the computational systems is described. The computing device 905 may be used to implement various computing devices discussed above with reference to FIGS. 1-8. The computing device 905 may include a processor 903 for controlling overall operation of the computing device 905 and its associated components, including RAM 906, ROM 907, input/output device 909, communication interface 911, and/or memory 915. A data bus may interconnect processor(s) 903, RAM 906, ROM 907, memory 915, I/O device 909, and/or communication interface 911. In some embodiments, computing device 905 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 909 may include a microphone, keypad, touch screen, and/or stylus motion, gesture, through which a user of the computing device 905 may provide input, and may also include one or more speakers for providing audio output and a video display device for providing textual, audiovisual, and/or graphical output. Software may be stored within memory 915 to provide instructions to processor 903 allowing computing device 905 to perform various actions. For example, memory 915 may store software used by the computing device 905, such as an operating system 917, application programs 919, and/or an associated internal database 921. The various hardware memory units in memory 915 may include volatile and nonvolatile, removable and non-removable media implemented in any method or technology for storage of information such as computer-readable instructions, data structures, program modules, or other data. Memory 915 may include one or more physical persistent memory devices and/or one or more non-persistent memory devices. Memory 915 may include, but is not limited to, random access memory (RAM) 906, read only memory (ROM) 907, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 903.

Communication interface 911 may include one or more transceivers, digital signal processors, and/or additional circuitry and software for communicating via any network, wired or wireless, using any protocol as described herein.

Processor 903 may include a single central processing unit (CPU), which may be a single-core or multi-core processor, or may include multiple CPUs. Processor(s) 903 and associated components may allow the computing device 905 to execute a series of computer-readable instructions to perform some or all of the processes described herein. Although not shown in FIG. 9, various elements within memory 915 or other components in computing device 905, may include one or more caches, for example, CPU caches used by the processor 903, page caches used by the operating system 917, disk caches of a hard drive, and/or database caches used to cache content from database 921. For embodiments including a CPU cache, the CPU cache may be used by one or more processors 903 to reduce memory latency and access time. A processor 903 may retrieve data from or write data to the CPU cache rather than reading/writing to memory 915, which may improve the speed of these operations. In some examples, a database cache may be created in which certain data from a database 921 is cached in a separate smaller database in a memory separate from the database, such as in RAM 906 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 905 are described separately, functionality of the various components may be combined and/or performed by a single component and/or multiple computing devices in communication without departing from the invention.

One aspect of the present disclosure pertains to a method. The method includes: accessing an electronic network that contains a plurality of electronic modules, the electronic modules specifying actions to be performed in response to different conditions of the electronic network being met, respectively; gathering, over a period of time, data pertaining to a plurality of events that are associated with at least some of the conditions, wherein the data indicates a coverage of the events by each of the electronic modules; constructing a matrix based on the plurality of electronic modules and the plurality of events; identifying a redundant electronic module from the plurality of electronic modules, wherein the identifying comprises performing operations on the matrix, and wherein the coverage of the events corresponding to the redundant electronic module is duplicated by one or more other electronic modules of the plurality of electronic modules; and determining whether the redundant electronic module should be removed from the electronic network;

Another aspect of the present disclosure pertains to a system. The system includes a processor and a non-transitory computer-readable medium having stored thereon instructions that are executable by the processor to cause the system to perform operations comprising: accessing an electronic network that contains a plurality of electronic modules, the electronic modules each having a predefined functionality, respectively; collecting data associated with the electronic modules over a predefined period of time; accessing a matrix that is constructed based on the collected data; detecting, based on the accessing of the matrix, a redundant electronic module from the plurality of electronic modules, a functionality of the redundant electronic module being replicated collectively by one or more other electronic modules of the plurality of electronic modules; evaluating a value added by the redundant electronic module to the electronic network; and determining, based on the evaluating, whether the redundant electronic module should be removed from the electronic network.

Yet another aspect of the present disclosure pertains to a non-transitory machine-readable medium having stored thereon machine-readable instructions executable to cause a machine to perform operations comprising: accessing an electronic network that contains a plurality of electronic modules, the electronic modules monitoring statuses of different components of the electronic network and specifying actions to be performed in response to the monitored statuses; collecting, over a period of time, data pertaining to the monitored statuses and actions taken as a result; accessing a matrix that is constructed at least in part based on the collected data; identifying, based on the matrix, a redundant electronic module from the plurality of electronic modules, wherein a status monitored by the redundant electronic module and an action taken by the redundant electronic module are duplicated by one or more other electronic modules of the plurality of electronic modules; and determining whether the redundant electronic module should be removed from the electronic network.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:

accessing an electronic network that contains a plurality of electronic modules, the electronic modules specifying actions to be performed in response to different conditions of the electronic network being met;

gathering, over a period of time, data pertaining to a plurality of events that are associated with at least some of the conditions, wherein the data indicates a coverage of the events by each of the electronic modules;

constructing a matrix based on the plurality of electronic modules and the plurality of events;

identifying a redundant electronic module from the plurality of electronic modules, wherein the identifying comprises performing operations on the matrix, and wherein the coverage of the events corresponding to the redundant electronic module is duplicated by one or more other electronic modules of the plurality of electronic modules; and determining whether the redundant electronic module should be removed from the electronic network;

wherein at least one of the accessing, the gathering, the constructing, the identifying, or the determining is performed by a computer system.

2. The method of claim 1, wherein:

the electronic network comprises a vehicle or an Internet of Things (IoT) network;

the plurality of electronic modules comprise a plurality of electronic sensors implemented on the vehicle or the IoT network; and each of the electronic sensors is configured to monitor a status of the vehicle or the IoT network.

3. The method of claim 1, wherein:

the electronic network comprises a medical device system for a person or for an entity;

the plurality of electronic modules comprise a plurality of electronic sensors implemented on the medical device system; and each of the electronic sensors is configured to monitor a status of the person or a status of the entity.

4. The method of claim 1, wherein:

the electronic network comprises an online transaction system;

the plurality of electronic modules comprises a plurality of fraud prevention rules; and each of the fraud prevention rules is configured to:

monitor user activities of users of the online transaction system; and specify an action to be taken by the online transaction system in response to a predefined user activity being monitored.

5. The method of claim 1, wherein:

the electronic network comprises a network security system;

the plurality of electronic modules comprises a plurality of network security rules; and each of the network security rules is configured to:

monitor data traffic on the network security system; and specify an action to be taken by the network security system in response to a predefined pattern of data traffic being monitored.

6. The method of claim 1, wherein:

the data comprises simulation data in a computer simulation environment; and the determining is before the plurality of electronic modules of the electronic network are deployed to an actual production environment.

7. The method of claim 1, wherein the data gathered indicates which subset of the plurality of electronic modules were triggered for each of the plurality of events.

8. The method of claim 1, further comprising: determining, via a machine learning process, an optimized value for the period of time for which the data should be gathered.

9. The method of claim 1, wherein the operations performed on the matrix comprise a Gaussian elimination operation.

10. The method of claim 1, wherein the determining comprises determining that an incremental value provided by the redundant electronic module does not exceed a predefined threshold, and wherein the method further comprises removing the redundant electronic module from the electronic network in response to the determining that the incremental value provided by the redundant electronic module does not exceed the predefined threshold.

11. A system, comprising:
a processor; and
a non-transitory computer-readable medium having stored thereon instructions that are executable by the processor to cause the system to perform operations comprising:
  accessing a plurality of electronic modules communicatively coupled via an electronic network, the electronic modules each having a predefined functionality;
  collecting data associated with the electronic modules over a predefined period of time;
  accessing a matrix that is constructed based on the collected data;
  detecting, based on the matrix, a redundant electronic module from the plurality of electronic modules, a functionality of the redundant electronic module being replicated collectively by one or more other electronic modules of the plurality of electronic modules;
  evaluating a value added by the redundant electronic module to the electronic network; and
  determining, based on the value, whether the redundant electronic module should be removed from the electronic network.

12. The system of claim 11, wherein the electronic modules comprise:
electronic sensors of a vehicle configured to measure a status of the vehicle;
electronic sensors of an Internet of Things (IoT) network configured to measure a status of a node of the IoT network; or
electronic sensors of a medical device system configured to measure a status of a person or an entity using the medical device system.

13. The system of claim 11, wherein the electronic modules each specify:
a network security rule configured to monitor data traffic of the electronic network and determine an action to be taken in response to the monitored data traffic meeting a predefined condition; or
a fraud prevention rule configured to monitor transactions conducted via the electronic network and determine an action to be taken in response to the monitored transactions meeting a predefined condition.

14. The system of claim 11, wherein the data comprises simulation data in a computer simulation environment; and
the determining is before the plurality of electronic modules of the electronic network are deployed to a non-simulation environment.

15. The system of claim 11, wherein the operations further comprise performing Gaussian Elimination operations to the matrix until the matrix is in a predefined format, and wherein the redundant electronic module is detected based on the matrix in the predefined format.

16. The system of claim 11, wherein the operations further comprise: removing the redundant electronic module from the electronic network in response to a determination that the value added by the redundant electronic module to the electronic network fails to meet a predefined threshold.

17. A non-transitory machine-readable medium having stored thereon machine-readable instructions executable to cause a machine to perform operations comprising:
accessing an electronic network that contains a plurality of electronic modules, the electronic modules monitoring statuses of different components of the electronic network and specifying actions to be performed in response to the monitored statuses;
collecting, over a period of time, data pertaining to the monitored statuses and actions taken as a result;
accessing a matrix that is constructed at least in part based on the collected data;
identifying, based on the matrix, a redundant electronic module from the plurality of electronic modules, wherein a status monitored by the redundant electronic module and an action taken by the redundant electronic module are duplicated by one or more other electronic modules of the plurality of electronic modules; and
determining whether the redundant electronic module should be removed from the electronic network.

18. The non-transitory machine-readable medium of claim 17, wherein the electronic network comprises a vehicle system, an Internet of Things (IoT) system, a medical device system, a network security system, or an electronic transaction system.

19. The non-transitory machine-readable medium of claim 17, wherein the operations further comprise: removing the redundant electronic module from the electronic network in response to the determining indicating that a value provided by the redundant electronic module to the electronic network is below a predefined threshold.

20. The non-transitory machine-readable medium of claim 17, wherein:
the collecting comprises collecting data in a simulated environment; and
the determining comprises determining whether the redundant electronic module should be removed from the electronic network before the plurality of electronic modules are deployed to an actual production environment.

\* \* \* \* \*